United States Patent
Barbu et al.

(10) Patent No.: US 9,614,632 B2
(45) Date of Patent: Apr. 4, 2017

(54) DEVICES AND METHODS FOR PROCESSING ONE OR MORE RECEIVED RADIO SIGNALS

(71) Applicant: Intel IP Corporation, Santa Clara, CA (US)

(72) Inventors: Oana-Elena Barbu, Aalborg (DK); Carles Navarro Manchon, Aalborg (DK); Bernard Fleury, Aalborg (DK); Christian Rom, Norresundby (DK); Tommaso Balercia, Aalborg (DK)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/751,164

(22) Filed: Jun. 26, 2015

(65) Prior Publication Data
US 2016/0380715 A1    Dec. 29, 2016

(51) Int. Cl.
| H04B 1/10 | (2006.01) |
| H04J 11/00 | (2006.01) |
| H04B 1/12 | (2006.01) |
| H04L 12/26 | (2006.01) |

(52) U.S. Cl.
CPC ........ *H04J 11/0063* (2013.01); *H04B 1/1027* (2013.01); *H04B 1/1081* (2013.01); *H04B 1/123* (2013.01); *H04L 43/087* (2013.01)

(58) Field of Classification Search
CPC .......... H04B 1/10; H04B 1/715; H04B 1/719; H04B 7/02; H04B 15/00; H04L 25/08; H04L 25/03821; H04L 27/2691

USPC ....... 375/346, 359, 360, 353, 367, 378, 384, 375/385, 316, 340, 341, 347
See application file for complete search history.

(56) References Cited

U.S. PATENT DOCUMENTS

| 8,938,040 B2 * | 1/2015 | Alexander ............ H04L 1/0045 375/232 |
| 2012/0324308 A1 * | 12/2012 | Goto ....................... H04L 1/005 714/752 |
| 2014/0204991 A1 * | 7/2014 | Huang .............. H03M 13/2975 375/232 |

(Continued)

OTHER PUBLICATIONS

Prasad et al.: "Joint Approximately Sparse Channel Estimation and Data Detection in OFDM Systems Using Sparse 3ayesian Learning", IEEE Transactions on Signal Processing, Jul. 15, 2014, pp. 3591-3603, vol. 62, No. 14.

*Primary Examiner* — Siu Lee
(74) *Attorney, Agent, or Firm* — Viering, Jentschura & Partner mbB

(57) ABSTRACT

A method for processing one or more received radio signals is provided. The method may include performing a channel estimation of a transmission channel for at least a portion of the one or more radio signals received, to identify at least one soft channel parameter representing a channel impulse response of the transmission channel, and identifying at least one soft intercarrier interference parameter representing an interference for the one or more radio signals received using a first frequency carrier. The interference is caused by the one or more radio signals received using a second frequency carrier. The method may further include detecting soft data from the one or more radio signals based at least on the at least one soft channel parameter and the at least one soft intercarrier interference parameter.

23 Claims, 4 Drawing Sheets

(56) References Cited

U.S. PATENT DOCUMENTS

2014/0348120 A1* 11/2014 Kant .................... H04L 1/1835
370/329
2015/0003542 A1   1/2015 Barbu et al.

* cited by examiner

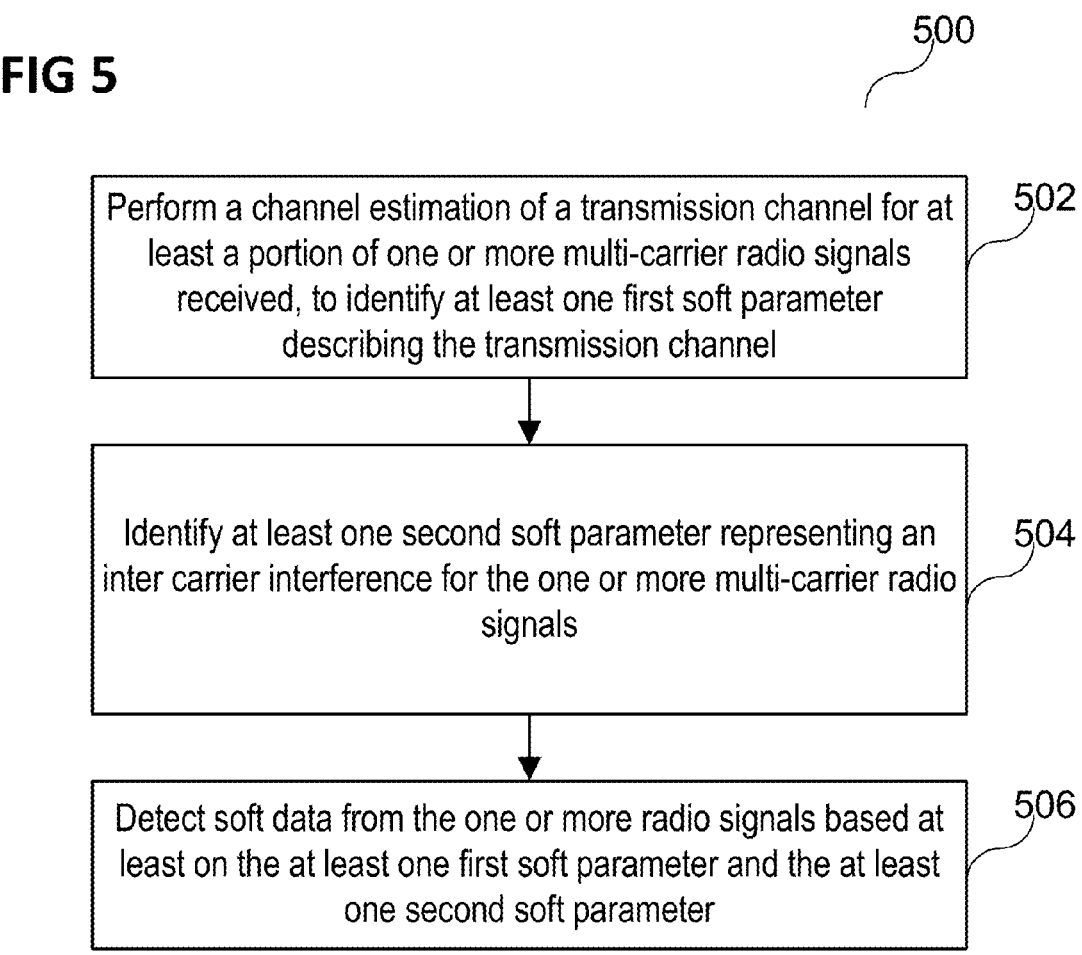

DEVICES AND METHODS FOR PROCESSING ONE OR MORE RECEIVED RADIO SIGNALS

TECHNICAL FIELD

Various embodiments relate generally to devices and methods for processing one or more received radio signals.

BACKGROUND

Multi-carrier radio signal such as e.g. orthogonal frequency division multiplexing (OFDM) radio signals transmitted over a (fast) time-varying channel usually experience orthogonality loss between all system subcarrier frequencies. This may cause a receiver to observe a signal corrupted by so called intercarrier interference (ICI) which may severely degrade the receiver detection capabilities.

A conventional receiver algorithm typically decouples the channel estimation and data detection or neglects the channel variations within the duration of one OFDM symbol. A conventional channel estimation technique is pilot-based and thus neglects ICI, thereby producing erroneous channel estimates. A conventional ICI cancelation scheme uses these channel estimates to reconstruct and cancel ICI in the signal before performing demodulation and decoding. However, since the accuracy of the channel estimate is impaired by ICI, so is the ICI cancelation and the overall bit error ratio (BER) performance of the receiver.

SUMMARY

A method for processing one or more received radio signals is provided. The method may include performing a channel estimation of a transmission channel for at least a portion of the one or more radio signals received, to identify at least one soft channel parameter representing a channel impulse response of the transmission channel, and identifying at least one soft intercarrier interference parameter representing an interference for the one or more radio signals received using a first frequency carrier. The interference is caused by the one or more radio signals received using a second frequency carrier. The method may further include detecting soft data from the one or more radio signals based at least on the at least one soft channel parameter and the at least one soft intercarrier interference parameter.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a flow diagram illustrating a method for processing one or more received multi-carrier radio signals

DESCRIPTION

Figure 1:
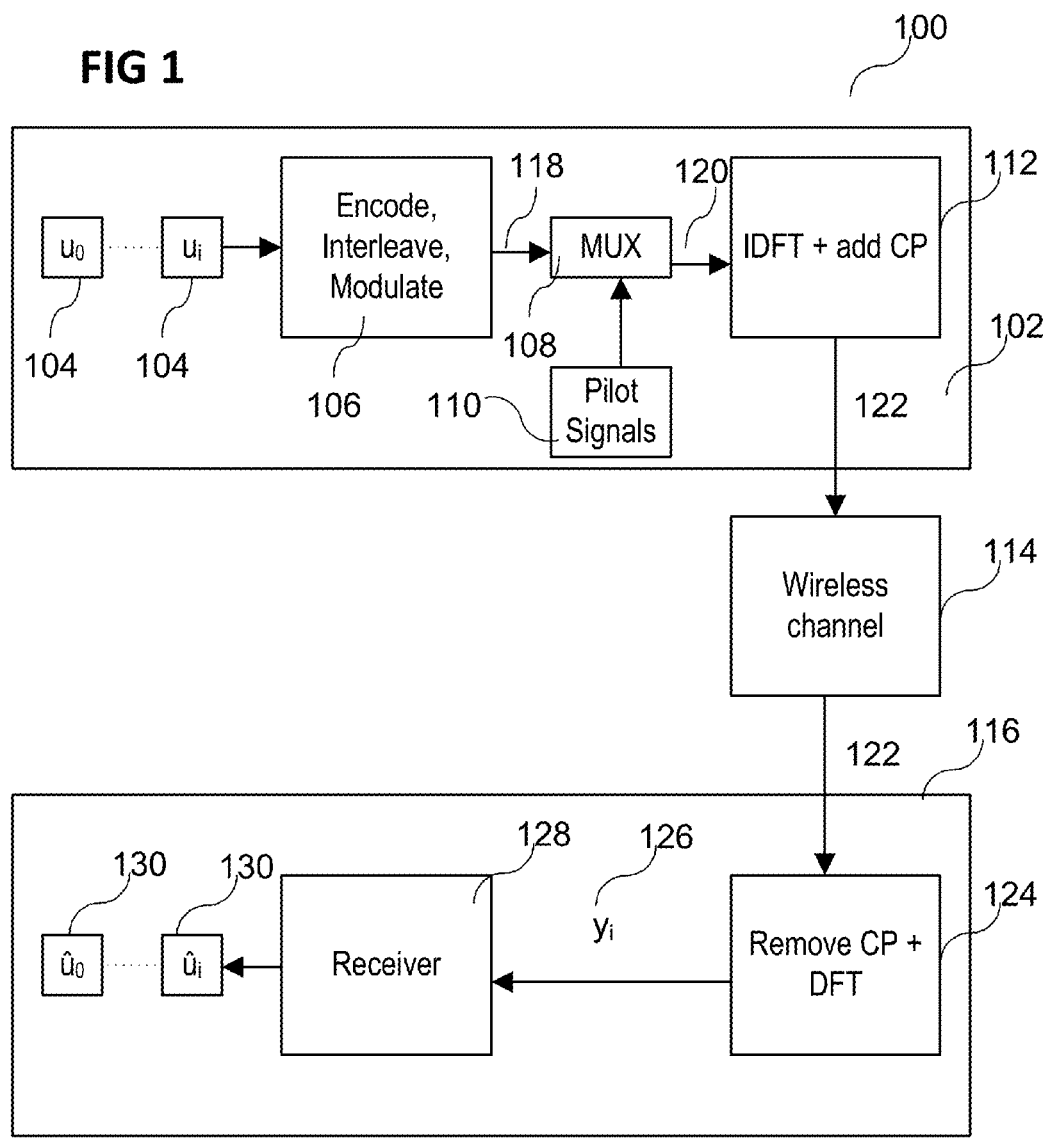
FIG. 1 shows a block diagram illustrating a radio communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

As used herein, a "cell" in the context of telecommunications may be understood as a sector served by a base station. Accordingly, a cell may refer to a set of geographically co-located antennas that correspond to a particular sectorization of a base station. A base station may thus serve one or more "cells" (or sectors), where each cell is characterized by at least one distinct communication channel.

Various aspects of this disclosure illustratively provide a receiver method that uses e.g. approximate Bayesian inference to iterate between computing soft estimates of a time-varying channel impulse response (CIR), soft interference reconstruction and soft data detection. A "soft" value is to be understood as a probability value in the range from 0 to 1.

In the following, it is assumed that (a) the time-varying CIR includes only a few dominant multipath components (in the following also referred to as taps), i.e. is sparse, and (b) a circuit models the time variation of each tap gain as a linear combination of functions from a preselected basis. Thus, each tap gain may be characterized by the coefficients of its corresponding linear combination. As a consequence of (a), a vector of coefficients characterizing all CIR taps has few non-negligible entries occurring in blocks (it is block-sparse). To estimate these entries, tools from sparse Bayesian learning are used to enforce a block-sparse solution. However, it is to be mentioned that these assumptions are optional. In various aspects of this disclosure, a basis expansion model (BEM) may thus be provided and the coefficients thereof may be estimated.

FIG. 1 shows a block diagram illustrating a radio communication system 100. The radio communication system 100 may include a plurality of mobile radio communication terminal devices 102, 116. Each mobile radio communication terminal device 102, 116 may include the correspondingly provided circuits and components such as e.g. one or more antennas, an RF (radio frequency) transceiver circuit, a baseband circuit, and the like. The radio communication system 100 may further include a wireless channel 114 via which radio signals are transmitted and received by the respective mobile radio communication terminal devices 102, 116. Furthermore, the radio communication system 100 may include a network infrastructure including base stations, core network components and the like which are provided in accordance with one or more radio communication standards which are provided for radio communication between the plurality of mobile radio communication terminal devices 102, 116.

In the following, a transmission chain will be described as follows. During the $i^{th}$ transmission time interval, a bit vector $u_i$ ($u_i \in \{0,1\}^K$) of information bits (which may be a portion of encoded multimedia data, which may include e.g. video data and/or audio data and/or text data and/or any other kind of data as desired, and which may be stored in a memory of the mobile radio communication terminal device (in the following also referred to as User Equipment (UE)) 102. The bit vector $u_i$ may be provided to a first circuit 106, which may be configured to channel encode, optionally interleave, and modulate the bit vector $u_i$. By way of example, the first circuit 106 may encode the bit vector $u_i$ with a code rate R and interleave them into a code vector $c_i$ $$(c_i = [c_i^{(0)}, \ldots, c_i^{(N_D-1)}]^T).$$

The first circuit 106 may modulate the code vector $c_i$ onto $N_D$ complex symbols, and then may interleave or multiplex them e.g. with $N_P$ pilot symbols yielding in a symbol vector $x_i$, as will be described in more detail below.

The first circuit 106 may then apply the resulting modulated bit vector 118 to a multiplexer 108. Furthermore, radio pilot signals 110 may also be applied to the multiplexer 108. The multiplexer 108 may be configured to multiplex the resulting modulated bit vector 118 and the radio pilot signals 110 to generate a multiplexed bit vector 120 (which will also be referred to as symbol vector $x_i$ in the following ($x_i \in C^N$,), which it applies to a second circuit 112. The second circuit 112 may be configured to carry out e.g. an Inverse Discrete Fourier Transformation (IDFT) (in general an inverse spectral transformation) to the multiplexed bit vector 120. The second circuit 112 may further add so-called cyclic prefix (CP), to thereby generate transmission data 122. IN other words, the second circuit 112 may pass the symbol vector $x_i$ through an inverse DFT circuit of the second circuit 112 and may prepend a µ samples long cyclic prefix (CP). This results e.g. B OFDM symbols forming the transmission block, in general the transmission data 122, which are then transmitted over a time-varying channel (e.g. the wireless channel 114) having an impulse response composed of a plurality of $\tilde{L}$ multipath components.

The first mobile radio communication terminal device 102 may transmit the transmission data 122 to a mobile radio base station, for example to a NodeB, e.g. to an eNodeB, depending on the implemented mobile radio communication standard, for example using an RF circuit and one or more antennas. Furthermore, the second mobile radio communication terminal device 116 may receive the transmission data 122 via the wireless channel 114, for example using one or more antennas and a RF transceiver circuit (not shown). As shown in FIG. 1, second mobile radio communication terminal device 116 may include a first receiving circuit 124, which may be configured to remove the CP and to carry out a Discrete Fourier Transformation (DFT) (in general a spectral transformation) on those received radio signals without the CP, to thereby generate received signals $y_i$ 126. The first receiving circuit 124 applies the generated received signals $y_i$ 126 to a second receiving circuit 128. The second receiving circuit 128 is configured to carry out the process to determine a reconstructed bit vector $\hat{\mu}_i$ 130, which may then be source decoded to reconstructed multimedia data, which may include e.g. reconstructed video data and/or reconstructed audio data and/or reconstructed text data and/or any other kind of reconstructed data as desired. The process to determine a reconstructed bit vector $\hat{\mu}_i$ 130 will be described in more detail below.

The radio communication system 100 may implement and thus provide one or more of the following mobile radio-communication standard technologies:

Universal Mobile Telecommunications System (UMTS);
Long Term Evolution (LTE); and/or
Long Term Evolution Advanced (LTE-A); and/or
any other suitable mobile radio communication standard technology.

The radio communication system 100 may implement and thus provide a multi-carrier radio transmission technology, which provides a plurality of frequency carriers to which data may be modulated. One example of a multi-carrier radio transmission technology is the so-called orthogonal frequency division multiplexing (OFDM), which is configured to transmit data in so-called OFDM symbols, which are predefined time and frequency slots. However, any other multi-carrier radio transmission technology may be provided.

Using the OFDM transmission technology, the second circuit 112 may process the symbol vector $x_i$ e.g. into an OFDM symbol to which a cyclic prefix of length $\mu T_S$ is prepended. The resulting symbol of duration $T_{OFDM}$ may then be sent over a time-varying channel with impulse response, which may be expressed as follows:

$$\tilde{g}(t, \tau) = \sum_{l=0}^{\tilde{L}-1} \tilde{h}_l(t) \delta(\tau - \tau_l(t)), \quad (1)$$

wherein $\tilde{h}_l(t)$ models a time-varying gain of the l-th multipath component arriving with delay $\tau_l(t)$. It is assumed that $\max(\tau_l(t) | \forall t, l=0:\tilde{L}-1) \leq \mu T_S$. Typically, the outdoor wireless channel 114 exhibits only a few multipath components, therefore $\tilde{L}$ is small. In that respect the channel may be sparse.

In order to enable the second mobile radiocommunication device 116 to properly receive and decode the transmission data 122 transmitted via the wireless channel 114 (in general also referred to as air interface), the transmission characteristics of the wireless channel 114 is determined. By way of example, this is carried out by determining an channel input response by using an approximate channel input response (CIR) model as follows. The statisitical CIR model is implemented in the second (in this case the receiving) mobile radiocommunication device 116, e.g. in second receiving circuit 122, which will be described in more detail below.

To simplify the CIR model, the variation of the delay of each multipath component during a block of B OFDM symbols may be neglected. Since the delays are unknown, it may further be assumed that the multipath components (taps) may arrive with delays located on a grid with selected resolution $\Delta t$ and length $L\Delta\tau$.

With these assumptions the response as expressed in formula (1) above may be approximated as follows:

$$\tilde{g}(t,\tau) = \sum_{l=0}^{L-1} h_l(t)\delta(\tau - l\Delta\tau), \tag{2}$$

wherein $L \gg \tilde{L}$. In (2), $h_l(t)$ represents the time-variation of the tap with delay $l\Delta\tau$. By choosing a sufficiently fine resolution for the delay grid, a sufficiently accurate retrieve of the (few) true delays can be achieved, and therefore only a small number of taps $h_l(t)$ will have non-negligible values.

The received signal $y_i$ 126 at the output of the first receiving circuit 124 (which may include a DFT circuit) in FIG. 1 is:

$$y_i = H_i x_i + \xi_i, \tag{3}$$

$$H_i[m,p] = \frac{1}{N}\sum_{l=0}^{L-1} T[p,l] \sum_{k=0}^{N-1} \exp\left(-j2\pi k\frac{m-p}{N}\right) \cdot h_1[iN+k] \tag{4}$$

wherein $$h_l[iN+k] = h_l(kT_S + iT_{OFMD}), \text{ and} \tag{5}$$

$$T[p,l] = \exp\left(-j2\pi\frac{pl}{N}\frac{\Delta\tau}{T_S}\right). \tag{6}$$

Furthermore, it is assumed that the tap gain $h_l(t)$ during an observation period $t\in[t_0, t_0+\Delta t]$ can be expanded in a basis $\Psi$ using a rather small number of coefficients as follows:

$$h_1(t) = \Psi(t)\alpha_1, \tag{7}$$

wherein $\Psi(t) = [\Psi(t)[0], \ldots, \Psi(t)[D-1]]$ and $\alpha_1 = [\alpha_1[0], \ldots, \alpha_1[D-1]]^T$ and D depends on the maximum Doppler shift and duration $\Delta t$. By way of example, bases which may be used are the following functions: discrete cosine, discrete sine, Slepian basis etc.

Given the complex structure of $H_i$ in above formulas (3) and (4), an approximate representation that captures the time and frequency selectivity fo the channel impulse response as described above, is determined. This choice allows the exploitation of the subsequently explained block-sparsse property of the CIR model to ensure tractable solutions. To resolve the estimation problem, as will be described in more detail below, a variational Bayesian approach may be provided which treats the channel parameters and the bit vectors as unknown variables and aims at computing approximations of the posterior probability densities, which may also be referred to as beliefs. By way of example, the process may apply the so called hybrid MF-BP method that combines mean field (MF) approximation with belief propagation (BP). A graphical representation of the method consists on casting the so called factor graph representing the probabilistic model associated with the system and decomposing it into two subgraphs without common factor nodes; in each of the subgraphs, either MF or BP updates of the unknown variables are performed. In this context, a factor graph is a bipartite graph that depicts the dependencies in a probabilistic model by connecting each function with all the variables that are its arguments.

In order to receive an approximate received signal model which may be implemented by the second receiving circuit 128, formula (7) may be inserted into formula (4), which will result in the following:

$$y_i = A_i\alpha + \xi_i, \tag{8}$$

wherein $$A_i[m,:] = \sum_{l=0}^{L-1} \sum_{k=0}^{N-1} \Omega_i[lN+k,:] \sum_{p=0}^{N-1} \frac{x_i[p]}{N} \cdot \exp\left(-2\pi j\frac{pl\Delta\tau/T_s + k(m-p)}{N}\right), \tag{9}$$

wherein $$\alpha[lD+d] = \alpha_l[d]. \tag{10}$$

Moreover, the following is defined:

$$\Omega_i = I_L \otimes \Psi_i, \tag{11}$$

$$\Psi_i[k,d] = \Psi(T_S + iT_{OFDM})[d], l=0:L-1, d=[0:D-1], \\ D \ll Nb, \tag{12}$$

wherein $I_L$ is the identity matrix and $\otimes$ denotes the Kronecker product.

Thus, it can be realized that the second receiving circuit 128 needs now to compute only LD complex coefficients in order to cancel ICI and decode the reconstructed data.

Furthermore, since $L \gg \tilde{L}$, the vector $\alpha$ will probably have many "0" entries occurring in blocks. This feature may be enforced by selecting an appropriate probabilistic model and applying tools from so called block-sparse Bayesian learning. As a result, a channel estimator circuit implemented by the second receiving circuit 128 will compute only L'D coefficients, where $L' \ll L$.

In this context, it is to be noted that there is an implicit modeling of ICI in formula (9) above: the received signal at any subcarrier, namely $$y_i[m] = A_i[m,:]\alpha, m=0:N-1, \tag{13}$$

contains contributions of signals transmitted on all subcarriers, namely $$x_i[p], p=0:N-1. \tag{14}$$

The second receiving circuit 128 works under the assumption of a received signal which can be expressed as in formula (9). Using formula (9), together with a probabilistic modeling of all unknowns, and by performing approximate Bayesian inference, the second receiving circuit 128 computes soft estimates for $$\alpha, A_p, u_p, i=0:B-1, \tag{15}$$

and for the variance of the noise $\xi_i$.

It is to be noted that the joint probabilistic distribution function (pdf) for the above formula (9) is:

$$p(u_0, \ldots, u_{B-1}, c_0, \ldots, c_{B-1}, x_0, \ldots, x_{B-1}, \alpha, \gamma, \lambda, \quad (16)$$
$$y_0, \ldots, y_{B-1}) = f_{noise}(\lambda) f_h(\alpha, \gamma) f_m(\gamma) \cdot \prod_{n=0}^{B-1} f_{O_n}(x_n, \lambda, \alpha)$$
$$f_{C_n}(c_n, u_n) \prod_{k=0}^{N_D-1} f_{M_{n,k}}(x_n[d_k], c_n^{(k)}) \prod_{v=0}^{K-1} f_{u_n}[v](u_n[v])$$

wherein $$f_{O_n}(x_n, \lambda, \alpha) = p(y_n | x_n, \lambda, \alpha) = CN(y_n; A_n \alpha, \lambda^{-1} I_N), \quad (17)$$

$$f_{noise}(\lambda) = p(\lambda) = \frac{1}{\lambda}, \quad (18)$$

$$f_h(\alpha, \gamma) = p(\alpha | \gamma), \quad (19)$$

$$f_m(\gamma) = p(\gamma). \quad (20)$$

CN designates a complex Gaussian distribution and I designates the identity matrix.
The factors $$f_{M_{n,k}}(x_n[d_k], c_n^{(k)}) = I_{\{M(c_n^{(k)})\}}(x_n[d_k]), \quad (21)$$

$$f_{C_n}(c_n, u_n) = I_{\{C(u_n)\}}(c_n), \text{ and} \quad (22)$$

$$f_{u_n}[v](u_n[v]) = p(u_n[v]) = \frac{1}{2}, \quad (23)$$

enforce modulation and encoding constraints.

The updates of the beliefs of all variables are carried out in accordance with the MF-BP algorithm as follows.

To begin with, the estimation of the BEM coefficients is performed as follows: Applying MF-type updates, the belief $q(\alpha) = CN(\alpha, \mu_\alpha, \tau_\alpha)$ is obtained, wherein $$\sum_\alpha^{-1} = \langle \lambda \rangle_{q(\lambda)} \sum_{n=0}^{B-1} \langle A_n^H A_n \rangle_{q(x_n)} + \Lambda_\alpha^{-1} \quad (24)$$

$$\mu_\alpha = \langle \lambda \rangle_{q(\lambda)} \sum_\alpha \sum_{n=0}^{B-1} \langle A_n \rangle_{q(x_n)}^H y_n. \quad (25)$$

Then a clustered sparsity may be carried out assuming the prior $p(\gamma) = \Pi_{l=0}^{L-1} Ga(\gamma[l]; a, b)$. Consequently, its belief fully factorizes into a product of Gamma pdfs with first moment reading:

$$\langle \gamma[l] \rangle_{q(\gamma[l])} = \frac{a+1}{b + \langle \alpha_l^H V^{-1} \alpha_l \rangle_{q(\alpha)}}. \quad (26)$$

Eventually, a noise precision estimation and data detection may be carried out, wherein the belief of the noise precision is a Gamma pdf with first order momentum:

$$\langle \lambda \rangle_{q(\lambda)} = \frac{NB}{\sum_{n=0}^{B-1} \langle \|y_n - A_n \alpha\|_2^2 \rangle_{\sim q(\lambda)}}. \quad (27)$$

The belief of each modulated symbol $x_i[d_k]$, $d_k \in D$ is $q(x_i[d_k]) \propto m(x_i[d_k]) \cdot n(x_i[d_k])$ wherein $n(x_i[d_k]) = CN(x_i[d_k]; \mu_{i,d_k}, \rho_{i,d_k})$ with $$\mu_{i,d_k} = \rho_{i,d_k} \left\langle \lambda \left( y_i - \sum_{d_a \neq d_k} H_i[\bullet, d_a] x_i[d_a] \right)^H H_i[\bullet, d_k] \right\rangle_{\sim q(x_i[d_k])}, \text{ and} \quad (28)$$

$$\rho_{i,d_k}^{-1} = \langle \lambda H_i^H[\cdot, d_k] H_i[\cdot, d_k] \rangle_{\sim q(x_i[d_k])}. \quad (29)$$

$H_i$ above is updated with the estimates of $h_1 = \Psi_{\mu_\alpha}[1]$, and $m(x_i[d_k])$ corresponds to the soft remapping operation and is the message passed from a first factor node $f_{M_{i,k}}$ to variable node $x_i[d_k]$ in the BP subgraph. Computing soft estimates for $c_i$ and $u_i$ by belief propagation corresponds to the classical demapping and decoding. It is to be noted that the data detection scheme includes an interference cancellation process, wherein prior to computing the belief of $x_i[d_k]$, the received signal $y_i$ is cleansed from the ICI caused by all $x_i[d_a]$, $d_a \neq k$.

Figure 2:
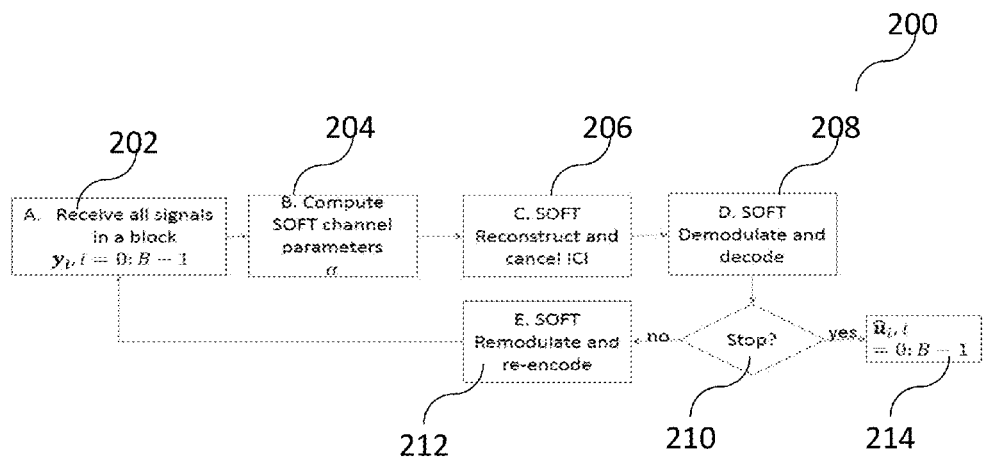
FIG. 2 shows a block diagram illustrating a method for processing a received radio signal.

FIG. 2 shows a block diagram 200 illustrating a method for processing a received radio signal, in more detail, a process implemented e.g. in the second receiving circuit 128 to determine the reconstructed bit vector $\hat{u}_i$ 130.

In a first process 202, the second receiving circuit 128 receives all radio signals $y_i$ 126 in a block B (i=0: B−1) from the first receiving circuit 126.

Then, in a second process 204, the second receiving circuit 128 applies the received signals $y_i$ 126 (i=0: B−1) to a channel estimation circuit implemented in the second receiving circuit 128, which determines and returns soft values (i.e. e.g. statistical mean values and variance values of the determined Gaussian probabilistic distribution functions) of the coefficients $\alpha$.

The second receiving circuit 128 may, in a third process 206, use these coefficients $\alpha$ to reconstruct the ICI contaminating the received signal, using the model as described above and a sparse Bayesian learning process.

Once the second receiving circuit 128 has canceled the ICI, it may soft demodulate and channel decode the radio signals in a fourth process 208.

Then, in a fifth process 210, the second receiving circuit 128 may test whether a predefined convergence criterion is fulfilled (e.g. a predefined number of iterations already performed) and if the predefined convergence criterion is not fulfilled ("no" in 210), the second receiving circuit 128 may soft re-encode and re-modulate the bits decoded in 208 in a sixth process 212. The output of the sixth process 212 is sent back to the first process, and the second receiving circuit 128 may start a new iteration of the first process by newly computing the entries of the matrix $A_i$ and refine the channel estimation in the second process 204 of the second (in general next) iteration. Thus, illustratively, the second receiving circuit 128 may carry out a complete new iteration including all the previously described processes 202, 204, 206, 208, and 210. However, if the predefined convergence criterion is fulfilled ("yes" in 210), the soft demodulated and channel decoded radio signals from the fourth process 208 will be considered as the reconstructed bit vector $\hat{u}_i$ 130 (i=0: B−1) (see seventh process 214 in FIG. 2).

Figure 3:
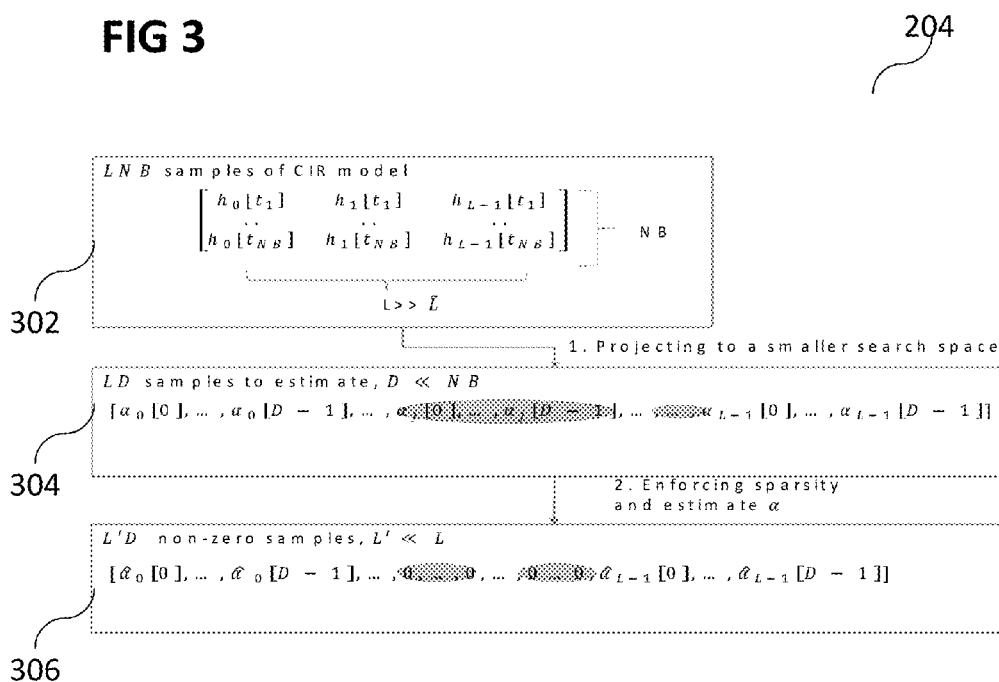
FIG. 3 shows a block diagram illustrating a partial process of the method for processing a received radio signal of FIG. 2.

FIG. 3 shows a block diagram illustrating a partial process of the method for processing a received radio signal of FIG. 2, namely the channel estimation process (in other words, the second process 204 as described above).

As illustrated in FIG. 3, in the channel estimation, the second receiving circuit 128 may, in the attempt to determine LNB samples of the above described CIR model (see block 302), under the assumption that L>>L̃, illustratively project the search problem into a smaller search space to estimate the coefficients α (see block 304). In order to further reduce the complexity of this estimation procedure using a Bayesian Learning method, the second receiving circuit 128 may enforce the sparsity of estimation block, and may carry out a sparse Bayesian learning method to enforce a block-sparse solution, as described above.

In other words, the second process 204 illustratively is designed under the assumption of a time varying CIR as in above formulas (2) and (7), and of a signal model given by formula (9). This means that the channel estimator is ICI-aware. The task of the second process 204 is to compute the coefficient vector α in formula (8). It is assumed that the coefficient vector $\alpha=[\alpha_0[0], \ldots, \alpha_{L-1}[D-1]]^T$ has many zero entries occurring in blocks. This property may be enforced with an appropriate probabilistic modeling. Then, the channel estimation circuit of the second receiving circuit 128 computes only L'D<<LNB soft coefficients α with which the third process 206 is able to reconstruct ICI.

In summary, in various aspects of this disclosure, the second receiving circuit (which may be a baseband circuit of a communication device) may be configured to apply tools from block-sparse signal recovery in conjunction with the ICI modelling in accordance with formula (9) above and the formulas (2) and (7).

In the following, the receiver process is illustrated which includes successive updates of the above mentioned beliefs e.g. until a maximum number of iterations (or another convergence criterion) has been reached (or another convergence criterion is fulfilled) as described in the following:

---

Algorithm 1 Receiver Algorithm based on (9)

1:   set L, $\Delta_T$
2:   initialize $\langle\lambda\rangle_{q(\lambda)}, \langle\gamma\rangle_{q(\gamma)}$ and $\langle x\rangle_{q(x_i)}$,
     $\langle|x_i|^2\rangle_{q(x_i)}$, i ∈ $\overline{0,B-1}$
3:   $i_{out} = 1$, $i_{in} = 1$
4:   for $i_{out} \leq O_M$ do
5:     for $i_{in} \leq I_M$ do
6:       update $\mu_\alpha, \Sigma_\alpha \leftarrow (11), \langle\gamma[l]\rangle_{q(\gamma)} \leftarrow (12)$,
        l ∈ $\overline{0,L-1}, \langle\lambda\rangle_{q(\lambda)} \leftarrow (13)$
7:       $i_{in} = i_{in} + 1$
8:     end for
9:     update $\langle x_i[k]\rangle_{q(x_i[k])}, \langle|x_i[k]|^2\rangle_{q(x_i[k])} \leftarrow (14)$, k ∈ D;
10:    $i_{out} = i_{out} + 1$
11:  end for

---

Figure 4:
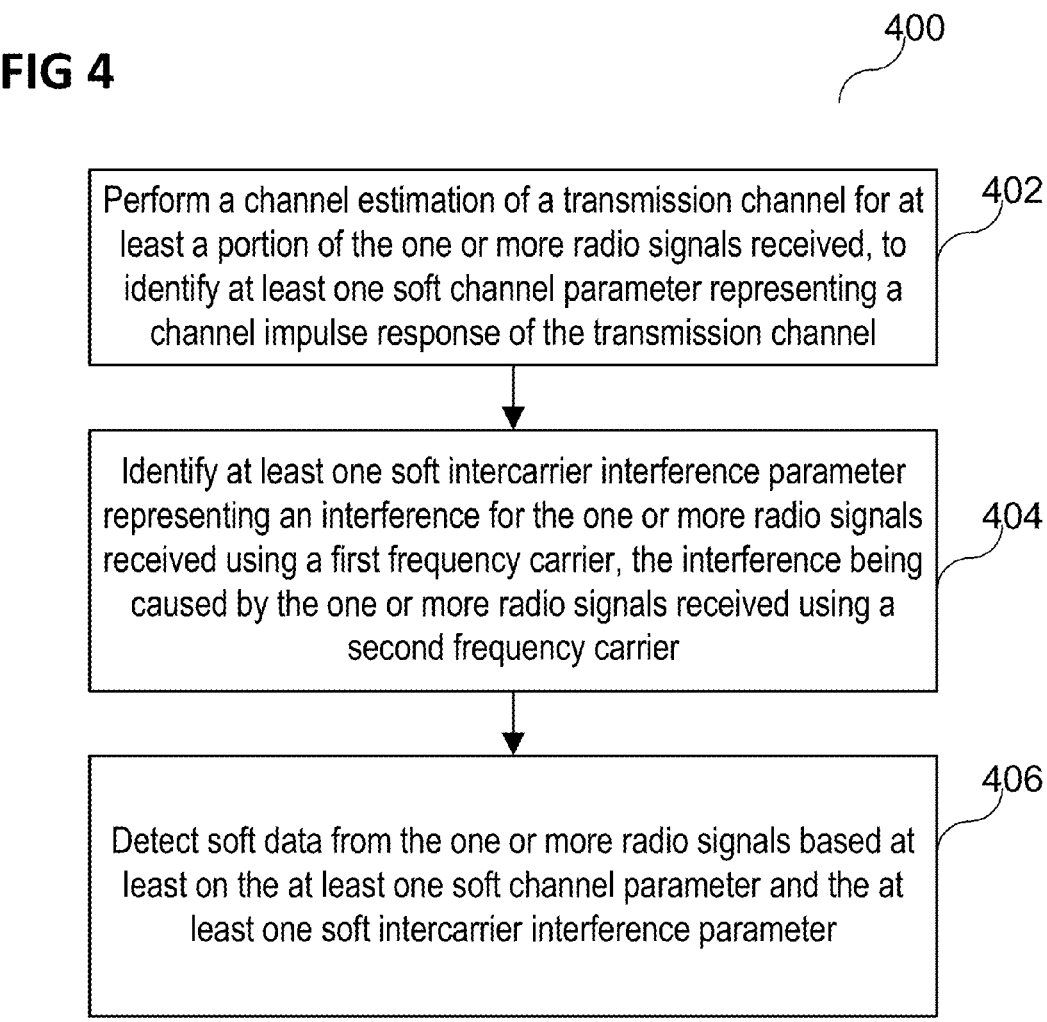
FIG. 4 shows a flow diagram illustrating a method for processing one or more received radio signals.

FIG. 4 shows a flow diagram illustrating a method 400 for processing one or more received radio signals. The method may include, in 402, performing a channel estimation of a transmission channel for at least a portion of the one or more radio signals received, to identify at least one soft channel parameter representing a channel impulse response of the transmission channel, and, in 404, identifying at least one soft intercarrier interference parameter representing an interference for the one or more radio signals received using a first frequency carrier. The interference is caused by the one or more radio signals received using a second frequency carrier. The method may further include, in 406, detecting soft data from the one or more radio signals based at least on the at least one soft channel parameter and the at least one soft intercarrier interference parameter.

FIG. 5 shows a flow diagram illustrating a method 500 for processing one or more received multi-carrier radio signals. The method may include, in 502, performing a channel estimation of a transmission channel for at least a portion of one or more multi-carrier radio signals received, to identify at least one first soft parameter describing the transmission channel, and, in 504, identifying at least one second soft parameter representing an inter carrier interference for the one or more multi-carrier radio signals. The method may further include, in 506, detecting soft data from the one or more radio signals based at least on the at least one first soft parameter and the at least one second soft parameter.

The following examples pertain to further aspects of the disclosure:

Example 1 is a method for processing one or more received radio signals. The method may include performing a channel estimation of a transmission channel for at least a portion of the one or more radio signals received, to identify at least one soft channel parameter representing a channel impulse response of the transmission channel and identifying at least one soft intercarrier interference parameter representing an interference for the one or more radio signals received using a first frequency carrier. The interference is caused by the one or more radio signals received using a second frequency carrier. The method may further include detecting soft data from the one or more radio signals based at least on the at least one soft channel parameter and the at least one soft intercarrier interference parameter.

In Example 2, the subject matter of Example 1 can optionally include that the one or more received radio signals represent one or more OFDM symbols.

In Example 3, the subject matter of any one of Examples 1 or 2 can optionally include that the method further includes repeating the method iteratively.

In Example 4, the subject matter of any one of Examples 1 to 3 can optionally include that a plurality of multipath components of the received one or more radio signals includes a plurality of basis vectors, each basis vector includes at least one multipath component of the plurality of multipath components, and each basis vector includes a basic vector function and one or more basis vector coefficients, to determine the soft channel parameters.

In Example 5, the subject matter of Example 4 can optionally include that performing the channel estimation includes generating a basis expansion model including the plurality of multipath components, and estimating the one or more basis vector coefficients of the basis expansion model.

In Example 6, the subject matter of any one of Examples 1 to 5 can optionally include that detecting soft data includes demodulating the one or more radio signals.

In Example 7, the subject matter of Example 6 can optionally include that detecting soft data includes decoding the demodulated one or more radio signals.

In Example 8, the subject matter of any one of Examples 6 or 7 can optionally include that the method further includes re-modulating the demodulated one or more radio signals, and performing the channel estimation of a subsequent iteration using the re-modulated one or more radio signals.

In Example 9, the subject matter of any one of Examples 1 to 8 can optionally include that performing the channel estimation includes performing approximate Bayesian inference.

In Example 10, the subject matter of Example 9 can optionally include that performing approximate Bayesian inference includes performing block-sparse approximate Bayesian inference.

Example 11 is a method for processing one or more received multi-carrier radio signals. The method may include performing a channel estimation of a transmission channel for at least a portion of one or more multi-carrier radio signals received, to identify at least one first soft parameter describing the transmission channel, and identifying at least one second soft parameter representing an inter carrier interference for the one or more multi-carrier radio signals. The method may further include detecting soft data from the one or more radio signals based at least on the at least one first soft parameter and the at least one second soft parameter.

In Example 12, the subject matter of Example 11 can optionally include that the one or more received multi-carrier radio signals represent one or more OFDM symbols.

In Example 13, the subject matter of any one of Examples 11 or 12 can optionally include that the method further includes repeating the method iteratively for one or more iterations.

In Example 14, the subject matter of any one of Examples 11 to 13 can optionally include that a plurality of multipath components of the received one or more radio signals includes a plurality of basis vectors, each basis vector includes at least one multipath component of the plurality of multipath components, and each basis vector includes a basic vector function and one or more basis vector coefficients, to determine the first soft parameters.

In Example 15, the subject matter of any one of Examples 11 to 14 can optionally include that performing the channel estimation includes generating a basis expansion model including the plurality of multipath components, and estimating the one or more basis vector coefficients of the basis expansion model.

In Example 16, the subject matter of any one of Examples 11 to 15 can optionally include that detecting soft data includes demodulating the one or more multi-carrier radio signals.

In Example 17, the subject matter of Example 16 can optionally include that detecting soft data includes decoding the demodulated one or more multi-carrier radio signals.

In Example 18, the subject matter of any one of Examples 16 or 17 can optionally include that the method further includes re-modulating the demodulated one or more multi-carrier radio signals, and performing the channel estimation of a subsequent iteration using the re-modulated one or more multi-carrier radio signals.

In Example 19, the subject matter of any one of Examples 11 to 18 can optionally include that performing the channel estimation includes performing approximate Bayesian inference.

In Example 20, the subject matter of Example 19 can optionally include that performing approximate Bayesian inference includes performing block-sparse approximate Bayesian inference.

Example 21 is a device for processing one or more received radio signals. The device may include a channel estimation circuit configured to perform a channel estimation of a transmission channel for at least a portion of the one or more radio signals received, to identify at least one soft channel parameter representing a channel impulse response of the transmission channel, and a circuit configured to identify at least one soft intercarrier interference parameter representing an interference for the one or more radio signals received using a first frequency carrier. The inference is caused by the one or more radio signals received using a second frequency carrier. The device may further include a detection circuit configured to detect soft data from the one or more radio signals based at least on the at least one soft channel parameter and the at least one soft intercarrier interference parameter.

In Example 22, the subject matter of Example 21 can optionally include that the one or more received radio signals represent one or more OFDM symbols.

In Example 23, the subject matter of any one of Examples 21 or 22 can optionally include that the device is configured to repeat the method iteratively.

In Example 24, the subject matter of any one of Examples 21 to 23 can optionally include that a plurality of multipath components of the received one or more radio signals includes a plurality of basis vectors, each basis vector includes at least one multipath component of the plurality of multipath components, and each basis vector includes a basic vector function and one or more basis vector coefficients, to determine the soft channel parameters.

In Example 25, the subject matter of Example 24 can optionally include that the channel estimation circuit is further configured to generate a basis expansion model including the plurality of multipath components, and to estimate the one or more basis vector coefficients of the basis expansion model.

In Example 26, the subject matter of any one of Examples 21 to 25 can optionally include that the detection circuit is further configured to demodulate the one or more radio signals.

In Example 27, the subject matter of Example 26 can optionally include that the detection circuit is further configured to decode the demodulated one or more radio signals.

In Example 28, the subject matter of any one of Examples 26 or 27 can optionally include that the device further includes a re-modulating circuit configured to re-modulate the demodulated one or more radio signals. The channel estimation circuit is configured to perform the channel estimation of a subsequent iteration using the re-modulated one or more radio signals.

In Example 29, the subject matter of any one of Examples 21 to 28 can optionally include that the channel estimation circuit is further configured to perform approximate Bayesian inference.

In Example 30, the subject matter of Example 29 can optionally include that the channel estimation circuit is further configured to perform block-sparse approximate Bayesian inference.

In Example 31, the subject matter of any one of Examples 21 to 30 can optionally include that the device is configured as a radio communication device.

In Example 32, the subject matter of Example 31 can optionally include that the device is configured as a radio communication terminal device.

In Example 33, the subject matter of Example 33 can optionally include that the device is configured as a radio communication base station device.

Example 34 is a device for processing one or more received multi-carrier radio signals. The device may include a channel estimation circuit configured to perform a channel estimation of a transmission channel for at least a portion of the one or more multi-carrier radio signals received, to identify at least one first soft parameter describing the transmission channel, and a circuit configured to identify at least one second soft parameter representing an inter carrier interference for the one or more multi-carrier radio signals. The device may further include a detection circuit configured to detect soft data from the one or more radio signals based at least on the at least one first soft parameter and the at least one second soft parameter.

In Example 35, the subject matter of Example 34 can optionally include that the one or more received multi-carrier radio signals represent one or more OFDM symbols.

In Example 36, the subject matter of any one of Examples 34 or 35 can optionally include that the device is configured to repeat the method iteratively.

In Example 37, the subject matter of any one of Examples 34 to 36 can optionally include that a plurality of multipath components of the received one or more radio signals includes a plurality of basis vectors, each basis vector includes at least one multipath component of the plurality of multipath components, and each basis vector including a basic vector function and one or more basis vector coefficients, to determine the first soft parameters.

In Example 38, the subject matter of Example 37 can optionally include that the channel estimation is further configured to generate a basis expansion model including the plurality of multipath components, and to estimate the one or more basis vector coefficients of the basis expansion model.

In Example 39, the subject matter of any one of Examples 34 to 38 can optionally include that the detection circuit is further configured to demodulate the one or more multi-carrier radio signals.

In Example 40, the subject matter of Example 39 can optionally include that the detection circuit is further configured to decode the demodulated one or more multi-carrier radio signals.

In Example 41, the subject matter of any one of Examples 39 or 40 can optionally include that the device further includes a re-modulating circuit configured to re-modulate the demodulated one or more multi-carrier radio signals. The channel estimation circuit is further configured to carry out the channel estimation of a subsequent iteration using the re-modulated one or more multi-carrier radio signals.

In Example 42, the subject matter of any one of Examples 34 to 41 can optionally include that the channel estimation circuit is further configured to perform approximate Bayesian inference.

In Example 43, the subject matter of Example 42 can optionally include that the channel estimation circuit is further configured to perform block-sparse approximate Bayesian inference.

In Example 44, the subject matter of any one of Examples 34 to 43 can optionally include that the device is configured as a radio communication device.

In Example 45, the subject matter of Example 44 can optionally include that the device is configured as a radio communication terminal device.

In Example 46, the subject matter of Example 44 can optionally include that the device is configured as a radio communication base station device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device for processing one or more received radio signals, the device comprising:
a channel estimation circuit configured to perform a channel estimation of a transmission channel for at least a portion of the one or more radio signals received, to identify at least one soft channel parameter representing a channel impulse response of the transmission channel;
a circuit configured to identify at least one soft intercarrier interference parameter representing an interference for the one or more radio signals received using a first frequency carrier, wherein the interference is caused by the one or more radio signals received using a second frequency carrier; and
a detection circuit configured to detect soft data from the one or more radio signals based at least on the at least one soft channel parameter and the at least one soft intercarrier interference parameter,
wherein a plurality of multipath components of the received one or more radio signals includes a plurality of basis vectors, each basis vector includes at least one multipath component of the plurality of multipath components, and each basis vector comprising a basic vector function and one or more basis vector coefficients, to determine the soft channel parameters.

2. The device of claim 1,
wherein the one or more received radio signals represent one or more OFDM symbols.

3. The device of claim 1,
wherein the channel estimation circuit is further configured to
generate a basis expansion model comprising the plurality of multipath components; and
estimate the one or more basis vector coefficients of the basis expansion model.

4. The device of claim 1,
wherein the detection circuit is further configured to demodulate the one or more radio signals.

5. The device of claim 4,
wherein the detection circuit is further configured to decode the demodulated one or more radio signals.

6. The device of claim 4, further comprising:
a re-modulating circuit configured to re-modulate the demodulated one or more radio signals;
wherein the channel estimation circuit is configured to perform the channel estimation of a subsequent iteration using the re-modulated one or more radio signals.

7. The device of claim 1,
configured as a radio communication device.

8. The device of claim 7,
configured as a radio communication terminal device.

9. The device of claim 7,
configured as a radio communication base station device.

10. The device of claim 1,
wherein the channel estimation circuit is further configured to perform approximate Bayesian inference.

11. A device for processing one or more received multi-carrier radio signals, the device comprising:
a channel estimation circuit configured to perform a channel estimation of a transmission channel for at least a portion of the one or more multi-carrier radio signals received, to identify at least one first soft parameter describing the transmission channel;
a circuit configured to identify at least one second soft parameter representing an inter carrier interference for the one or more multi-carrier radio signals; and a detection circuit configured to detect soft data from the one or more radio signals based at least on the at least one first soft parameter and the at least one second soft parameter, wherein a plurality of multipath components of the received one or more radio signals includes a plurality of basis vectors, each basis vector includes at least one multipath component of the plurality of multipath components, and each basis vector comprising a basic vector function and one or more basis vector coefficients, to determine the first soft parameters.

12. The device of claim 11, wherein the one or more received multi-carrier radio signals represent one or more OFDM symbols.

13. The device of claim 11, wherein the channel estimation is further configured to generate a basis expansion model comprising the plurality of multipath components; and
estimate the one or more basis vector coefficients of the basis expansion model.

14. The device of claim 11, wherein the detection circuit is further configured to demodulate the one or more multi-carrier radio signals.

15. The device of claim 14, further comprising:
a re-modulating circuit configured to re-modulate the demodulated one or more multi-carrier radio signals;
wherein the channel estimation circuit is further configured to carry out the channel estimation of a subsequent iteration using the re-modulated one or more multi-carrier radio signals.

16. The device of claim 11, configured as a radio communication device.

17. The device of claim 11, wherein the channel estimation circuit is further configured to perform approximate Bayesian inference.

18. The device of claim 17, wherein the channel estimation circuit is further configured to perform block-sparse approximate Bayesian inference.

19. A method for processing one or more received radio signals, the method comprising:
performing a channel estimation of a transmission channel for at least a portion of the one or more radio signals received, to identify at least one soft channel parameter representing a channel impulse response of the transmission channel;
identifying at least one soft intercarrier interference parameter representing an interference for the one or more radio signals received using a first frequency carrier, wherein the interference is caused by the one or more radio signals received using a second frequency carrier; and
detecting soft data from the one or more radio signals based at least on the at least one soft channel parameter and the at least one soft intercarrier interference parameter;
wherein a plurality of multipath components of the received one or more radio signals includes a plurality of basis vectors, each basis vector includes at least one multipath component of the plurality of multipath components, and each basis vector comprising a basic vector function and one or more basis vector coefficients, to determine the soft channel parameters.

20. The method of claim 19, further comprising performing the channel estimation includes generating a basis expansion model including the plurality of multipath components, and estimating the one or more basis vector coefficients of the basis expansion model.

21. The method of claim 19, wherein performing the channel estimation comprises performing approximate Bayesian inference.

22. A method for processing one or more received multi-carrier radio signals, the method comprising:
performing a channel estimation of a transmission channel for at least a portion of one or more multi-carrier radio signals received, to identify at least one first soft parameter describing the transmission channel;
identifying at least one second soft parameter representing an inter carrier interference for the one or more multi-carrier radio signals; and
detecting soft data from the one or more multi-carrier radio signals based at least on the at least one first soft parameter and the at least one second soft parameter, wherein a plurality of multipath components of the received one or more multi-carrier radio signals includes a plurality of basis vectors, each basis vector includes at least one multipath component of the plurality of multipath components, and each basis vector comprising a basic vector function and one or more basis vector coefficients, to determine the first soft parameters.

23. The method of claim 22, performing the channel estimation includes generating a basis expansion model including the plurality of multipath components, and estimating the one or more basis vector coefficients of the basis expansion model.

* * * * *